(12) United States Patent
Maeda (10) Patent No.: US 7,539,407 B2
(45) Date of Patent: May 26, 2009

(54) IMAGE TAKING APPARATUS WITH FLASH DEVICE

(75) Inventor: Yutaka Maeda, Saitama (JP)

(73) Assignee: Fujifilm Corporation, Tokyo (JP)

( * ) Notice: Subject to any disclaimer, the term of this patent is extended or adjusted under 35 U.S.C. 154(b) by 292 days.

(21) Appl. No.: 11/288,255

(22) Filed: Nov. 29, 2005

(65) Prior Publication Data

US 2006/0133061 A1 Jun. 22, 2006

(30) Foreign Application Priority Data

Nov. 30, 2004 (JP) .............................. 2004-347291

(51) Int. Cl.
G03B 15/03 (2006.01)
G03B 15/06 (2006.01)
G03B 7/26 (2006.01)
H04N 5/222 (2006.01)
G03B 15/02 (2006.01)
B60Q 1/06 (2006.01)
G02B 7/02 (2006.01)

(52) U.S. Cl. ...................... 396/178; 396/199; 396/205; 348/371; 362/6; 362/373; 359/819

(58) Field of Classification Search ................ 396/155, 396/199, 200, 205, 30, 176, 178, 180; 348/370, 348/371, 362; 362/6, 601, 603, 611–613, 362/373, 11; 359/819; 29/830
See application file for complete search history.

(56) References Cited

U.S. PATENT DOCUMENTS 2,756,485 A * 7/1956 Abramson et al. ............. 29/830
5,654,757 A * 8/1997 Murakami et al. ........... 348/357
5,678,096 A * 10/1997 Wakabayashi et al. ...... 396/348
6,256,067 B1 * 7/2001 Yamada ....................... 348/370
6,301,443 B1 * 10/2001 Mitsui et al. ................. 396/176
6,793,346 B2 * 9/2004 Nakano et al. .............. 353/119

(Continued)

FOREIGN PATENT DOCUMENTS

JP 2001-215579 A 8/2001

(Continued)

OTHER PUBLICATIONS http://en.wikipedia.org/wiki/Printed_circuit_board "Printed Circuit Board—Wikipedia, the free encyclopedia", pp. 1 through 17, updated Dec. 16, 2008.*

Primary Examiner—Melissa J Koval
(74) Attorney, Agent, or Firm—Birch, Stewart, Kolasch & Birch, LLP (57) ABSTRACT

An ornament plate of a ring-shape made of a metal with a high heat radiation effect, for instance, aluminum, is attached to an end surface on an object side of a lens barrel such that the ornament plate covers the whole front part of the lens barrel. Four kinds of LEDs of high luminance type constructing an LED light source are attached to the lens barrel through the ornament plate used as a substrate. A light diffusion cover made of a transparent resin is attached to the front of the ornament plate for covering the LEDs. When using the flash, a high voltage current is applied to the LEDs to emit flash light. Each LED generates heat. However, the heat is radiated through the ornament plate.

16 Claims, 12 Drawing Sheets

U.S. PATENT DOCUMENTS

| | | | |
|---|---|---|---|
| 6,799,864 B2* | 10/2004 | Bohler et al. | 362/236 |
| 6,847,783 B2* | 1/2005 | Sasaki et al. | 396/30 |
| 7,106,378 B2* | 9/2006 | Kawakami | 348/371 |
| 7,318,651 B2* | 1/2008 | Chua et al. | 362/11 |
| 2002/0025157 A1 | 2/2002 | Kawakami | |
| 2003/0160889 A1* | 8/2003 | Angeli | 348/362 |
| 2003/0218689 A1* | 11/2003 | Angeli et al. | 348/370 |
| 2004/0140988 A1* | 7/2004 | Kim | 345/700 |
| 2004/0212996 A1* | 10/2004 | Burckhardt | 362/249 |
| 2005/0030416 A1* | 2/2005 | Kametani et al. | 348/370 |
| 2006/0043879 A1* | 3/2006 | Naitou | 313/501 |
| 2006/0067667 A1* | 3/2006 | Kita | 396/180 |
| 2006/0268435 A1* | 11/2006 | Finizio et al. | 359/819 |
| 2008/0074535 A1* | 3/2008 | Ohsuga et al. | 348/371 |

FOREIGN PATENT DOCUMENTS

| | | |
|---|---|---|
| JP | 2003-101836 A | 4/2003 |
| JP | 2003-158675 A | 5/2003 |

* cited by examiner

IMAGE TAKING APPARATUS WITH FLASH DEVICE

BACKGROUND OF THE INVENTION

1. Field of the Invention

The present invention relates to an image taking apparatus such as a digital camera, a mobile phone with a camera and the like using a light emitting diode as a flash light source of a flash device.

2. Background Arts

Photographic film cameras, digital cameras, mobile phones with cameras and the like are known as image taking apparatuses. Many of the image taking apparatuses are equipped with flash devices so as to illuminate main subjects for taking beautiful pictures in low luminance conditions.

Xenon (Xe) tubes have been used as flash light sources in the conventional flash devices. However, as for the digital camera, a flash device using a light emitting diode (an LED) is recently suggested in terms of low noise, easy downsizing, and low cost.

For instance, an image taking apparatus with plural LEDs is known which can adjust the color balance of the flash light by sequentially emitting each LED at predetermined intervals or by adjusting light emitting time of each of the red, green and blue LEDs (see Japanese Patent Laid-Open Publication No. 2001-215579). Further, a mobile phone with a camera using a white LED as a flash emitter is known (see Japanese Patent Laid-Open publication No. 2003-158675) A slim-type digital camera and a mobile phone-with a camera in which plural LEDs are disposed around taking lenses on front surfaces of the bodies are known (see Japanese Patent Laid-Open Application Publication No.2003-101836). A flash device is known which uses red, green and blue LEDs as the flash light source and a ratio of respective light emission amounts is controlled according to the color temperature of the view field (see U.S. Patent Publication No. 2002/0025157).

The LEDs described above have a disadvantage that the light emission amount is small compared to the conventional xenon tubes. To achieve a sufficient light emission amount, a high voltage current should be supplied to the LEDs. However, the LEDs may be destroyed by the high heating value.

SUMMARY OF THE INVENTION

In view of the foregoing, an object of the present invention is to provide an image taking apparatus which prevents destruction of a light emitting diode (LED) used as a flash light source by heat.

To achieve the above and other objects, an LED light source is attached to a metal member having a heat radiation effect.

In a preferred embodiment, the image taking apparatus comprises a main body and a lens barrel. The main body or the lens barrel includes a solid state imaging device which converts an image of a subject into an electric signal. The metal member is attached to a front end surface of the lens barrel. As the metal member, an ornament plate attached to a front end surface of the lens barrel is used. The lens barrel is formed of plastic. However, the heat of the LED light source is radiated through the metal member. A conductive pattern for supplying the electric power to the LED light source is formed on the lens barrel.

The LED light source includes: at least one red LED which emits red flash light, at least one green LED which emits green flashlight, at least one blue LED which emits blue flash light and at least one white LED which emits white flashlight. An LED controller controls respective intensities of the red flashlight, the green flashlight, the blue flashlight and the white flashlight for adjusting a color balance of the flash light.

In another preferred embodiment according to the present invention, the LED light source is attached to a front of the main body through the metal member. In another preferred embodiment according to the present invention, the LED light source is attached to the front face of the main body having the heat radiation effect. In another preferred embodiment according to the present invention, the LED light source is attached to the front end surface of the lens barrel having the heat radiation effect.

According to the present invention, since the LED light source is attached to the metal member having the heat radiation effect, the heat of the LED light source is radiated through the metal member even when a large amount of electric current which provides the sufficient light emission amount is supplied to each of the LEDs. Accordingly, the destruction of the LEDs is prevented. Further, since the metal member which mounts the LED light source is attached to the front end surface of the lens barrel, there is no vignetting of the flashlight caused by the lens barrel. As a result, the flash light is effectively used. Further, since the optical axes of the flash light and the photographic light are approximately parallel, it becomes possible to take almost shadowless images. When the metal member also serves as the ornament plate of the lens barrel, the parts cost is reduced.

It is also possible to directly attach the LED light source to the front end surface of the lens barrel having the heat radiation effect or to the front of the main body having the heat radiation effect. In that case, there is no vignetting caused by the lens barrel when the image taking apparatus has a short focus lens and the like in which the lens barrel does not considerably protrude from the front of the main body. As a result, the flash is effectively used.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
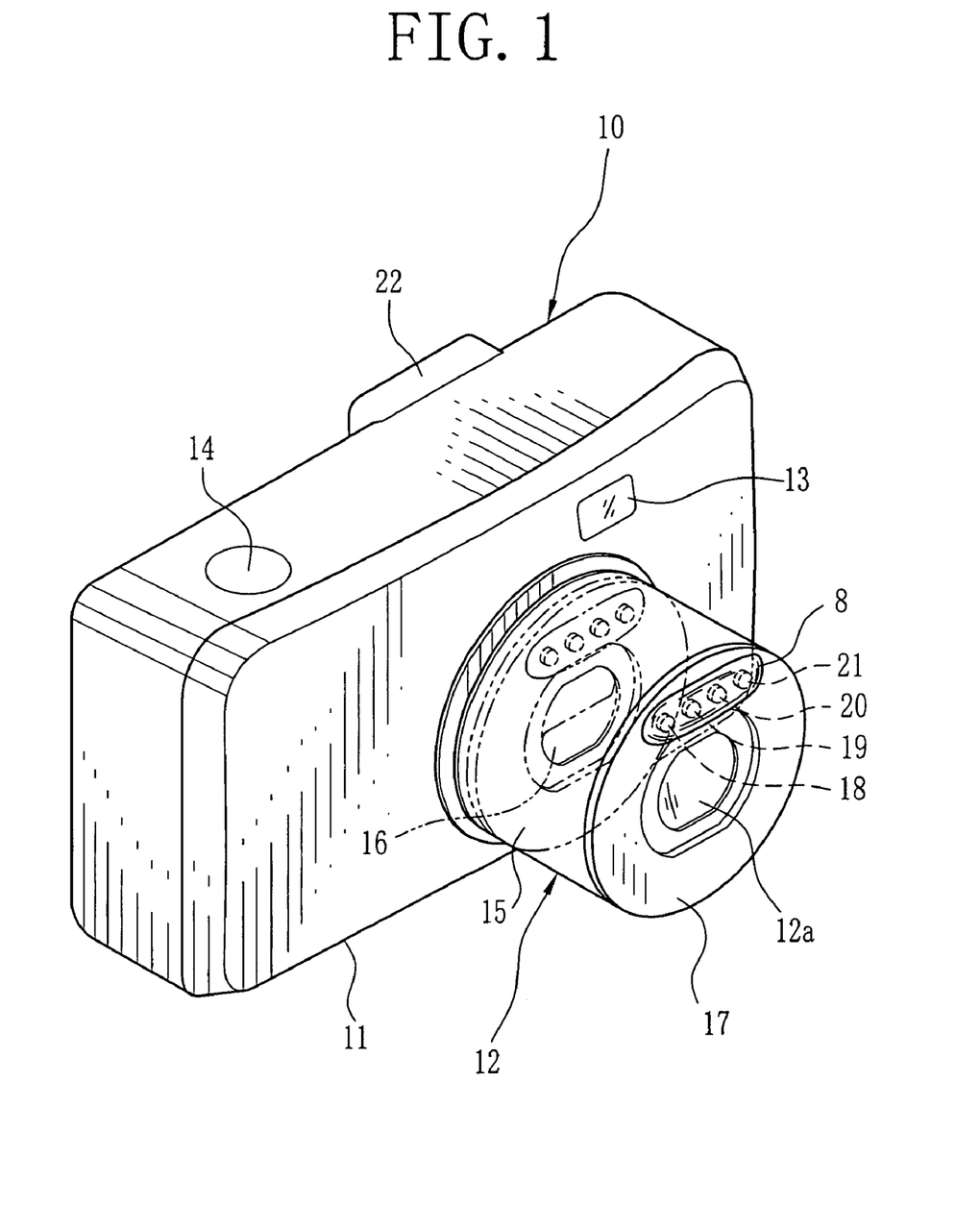
FIG. 1 is a perspective view of a digital camera according to the present invention when viewed from the front.

In FIG. 1, a digital camera 10 has a camera body (a main body) 11. On a front surface of the camera body 11, a taking lens 12 of a fixed-focus type and a front viewfinder window 13 are disposed. Further, on an upper surface of the camera body 11, a shutter button 14 is disposed. The taking lens 12 can be removably attached to the camera body 11.

A lens barrel 15 of the taking lens 12 is in a collapsed position as shown in a chain double-dashed line when the power is turned off. When the power is turned on, the lens barrel 15 is protruded to be ready for taking images. A lens barrier 16 is closed when the power is turned off or the lens barrel 15 is in the collapsed position. When the power is turned on, the lens barrier 16 is opened so that a lens system 12a is exposed.

The lens barrel 15 is formed of resin. A ring-like ornament plate 17 is attached to a front end surface (an end section on an object side) of the lens barrel 15 so as to cover the whole front end surface. The ornament plate 17 is formed of a metal with high heat radiation effect, for instance, aluminum. Using the ornament plate 17 as a base plate, four LEDs 18-21 of a high luminance type are attached to the lens barrel 15. The four LEDs 18-21 construct an LED light source of a flash device. Respective luminescent colors of the LEDs 18-21 are red (R), green (G), blue (B) and white (W).

A light diffusion cover 8 covering the LEDs 18-21 is attached to a front of the ornament plate 17. The light diffusion cover 8 is formed of a transparent resin and has an approximate long oval shape, and a center portion thereof is roundly protruded. Connecting cords respectively connect the LEDs 18-21 to a control section inside the camera body 11 through the lens barrel 15. Further, it is preferable to attach a connector to an end section of the connecting cord to be connected to the control section through the connector. It is also possible to use a flexible printed circuit board as the connecting cord.

A high-voltage current is supplied to the LEDs 18-21 for obtaining a sufficient light emission amount. The LEDs 18-21 are heated by the high-voltage current and the temperatures of the LEDs 18-21 become high. However, such high temperatures can be efficiently reduced by the ornament plate 17 as a heat sink. Thereby, the destruction of the heat-sensitive LEDs 18-21 is prevented. Further, since the ornament plate 17 also serves as the heat sink for the LEDs 18-21, it becomes unnecessary to provide the heat sink separately. Thus, the parts cost is reduced.

Further, since the LED light source (the LEDs 18-21) is disposed on the front end of the lens barrel 15, vignetting of the flash light caused by the lens barrel 15 is prevented, and thus the flash light is effectively used. Furthermore, since the optical axes of the flash light and the photographic light are approximately parallel, it becomes possible to take almost shadowless images.

Figure 2:
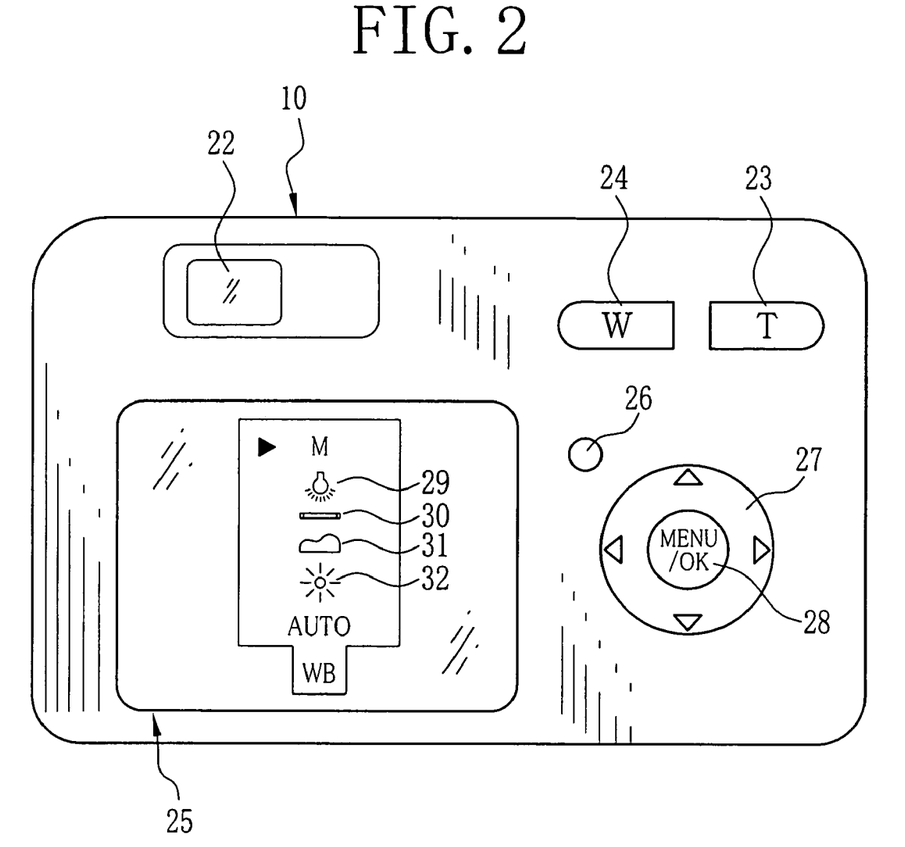
FIG. 2 is a back view of the digital camera shown in FIG. 1.

On the back of the camera body 11, as shown in FIG. 2, a rear viewfinder window 22, a tele-zoom key 23, a wide-zoom key 24, an LCD monitor 25, a backward button 26 for display, a cross key 27 and a menu/OK button 28 are disposed. The zoom keys 23 and 24 are used for operating an electronic zoom which electronically enlarges or reduces the size of the image data. The menu/OK button 28 is disposed at the center of the cross key 27.

After displaying a main menu (not shown) by pressing the menu/OK button 28, when the white balance correction (WB) is selected by operating the cross key 27, plural icons and letters are displayed on the LED monitor 25 as shown in FIG. 2. The default is an auto mode. However, by operating the cross key 27 and the menu/OK button 28, the user can change the setting to a manual (M) mode and select one of light source icons 29-32 which display the light sources in schematic forms.

When one of the light source icons 29-32 is selected, the LEDs 18-20 automatically emit light by a predetermined ratio of respective light emission amounts according to the selected light source icon. When the light source icon 29 of a light bulb is selected, the ratio of the respective light emission amounts is set to reduce a redness caused by a tungsten light. When the light source icon 30 of the fluorescent tube is selected, the ratio of the respective light emission amounts is set to reduce a greenness caused by the fluorescent tube. When the light source icon 31 of a cloud 31 is selected, the ratio of respective light emission amounts is set to reduce an amber color caused by a cloudy weather. When the light source icon 32 of the sun is selected, the ratio of respective light emission amounts is set to reduce a blueness caused by the fine weather.

Figure 3:
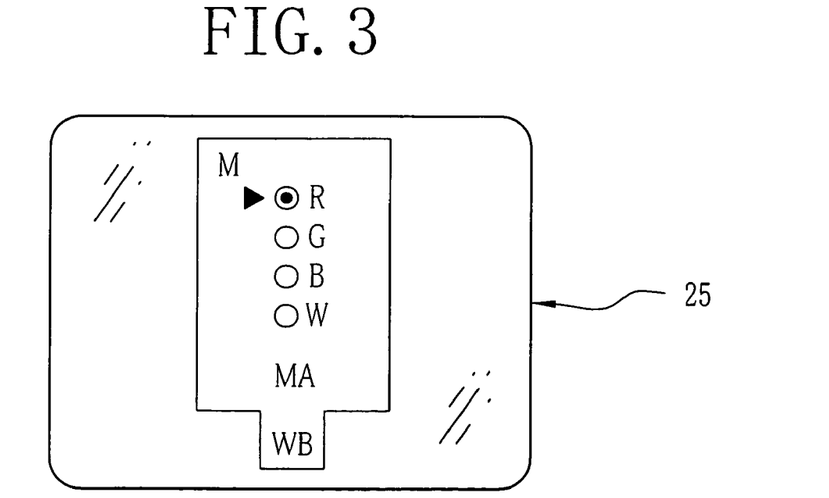
FIG. 3 is an explanatory view showing a liquid crystal display monitor showing a screen for white balance adjustment.

When the manual mode (M) is selected, a sub menu is displayed as shown in FIG. 3. Radio buttons are respectively displayed in front of the letters "R", "G", "B" and "W". By turning on the radio buttons, the LEDs (red, green, blue and white LEDs) 18-21 are arbitrarily emitted. One or plural LEDs 18-21 can be turned on at the same time. That is, in the manual mode, the user can freely select the LEDs to be emitted to create an original effect.

Further, separated from the above "R", "G", "B" and "W", an MA mode is provided. In the MA mode, the aperture stop and the shutter speed are set to reduce the exposure by, for instance, 1EV from the correct exposure in a scene in which the flash light is normally determined to be unnecessary. Accordingly, in the MA mode, the flash light is emitted such that the light emission amount and the ratio of the respective light emission amounts of the LEDs 18-21 are automatically set to compensate the reduced exposure (1EV) and correct the color temperature.

Figure 4:
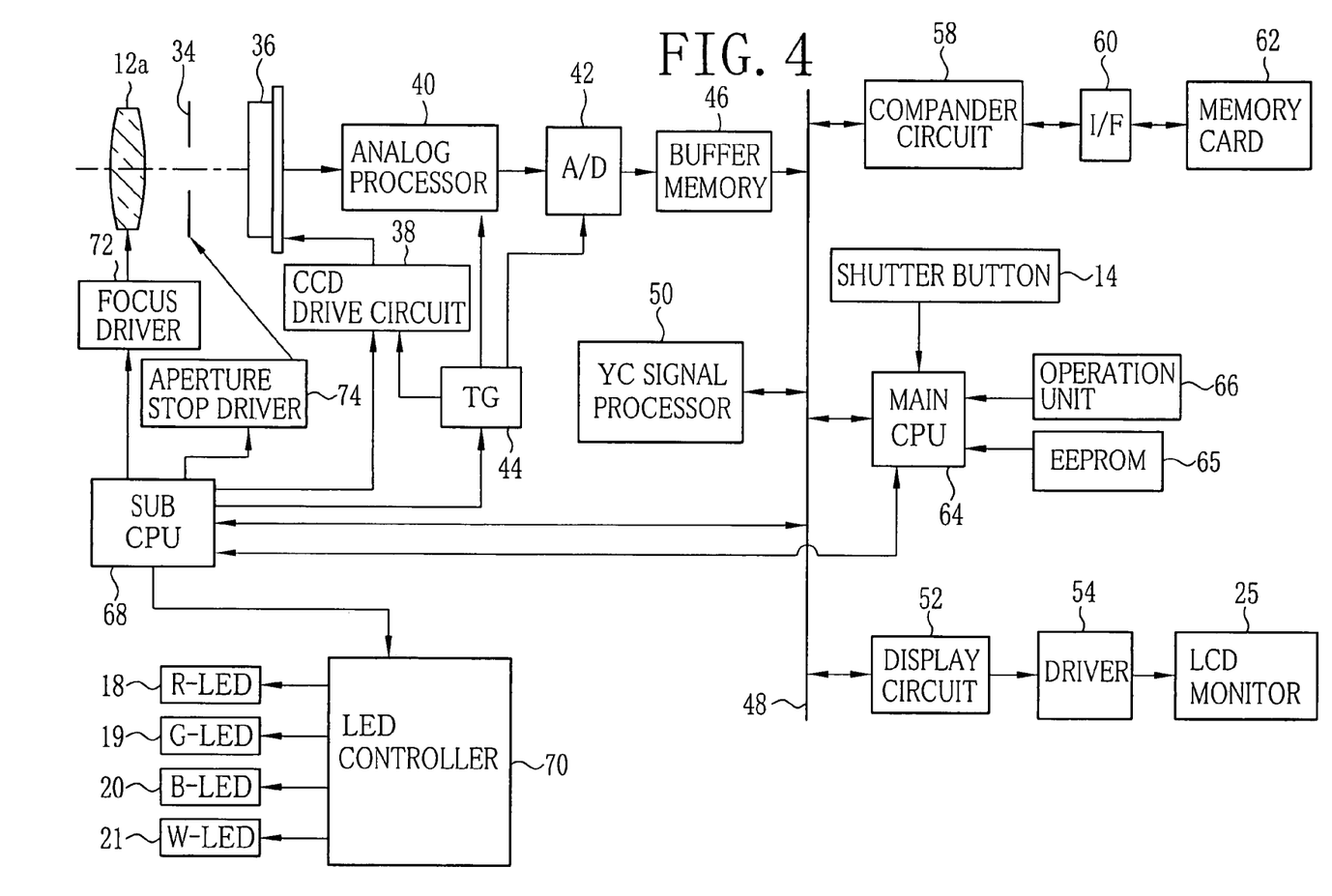
FIG. 4 is a block diagram showing an electrical configuration of the digital camera shown in FIG. 1.

As shown in FIG. 4, a subject image is formed on a light receiving surface of a solid state imaging device (CCD) 36 through the lens system 12a and an aperture stop 34. In the CCD 36, a plurality of photo diodes are arranged in the light receiving surface and the subject image is converted into signal charges by each photo diode according to an amount of incident light. The signal charge is transferred to a shift register by a lead gate pulse from a CCD drive circuit 38, converted into a voltage signal corresponding to the signal charge and sequentially read by a register transfer pulse. The CCD 36 has a so-called electronic shutter function in which a charge store time (a shutter speed) is controlled by discharging the stored signal charge to the circuit board of the CCD 36 by the shutter gate pulse. The CCD 36 is disposed in the taking lens 12 or in the camera body 11.

The voltage signal sequentially read from the CCD 36 is sent to an analog processor 40. The analog processor 40 includes signal processing circuits such as a sampling hold circuit, a color separation circuit, a gain adjustment circuit and the like. In the analog processor 40, a CDS (Correlated double sampling) processing is applied to the voltage signal and the voltage signal is separated into the color signals (red, green and blue). Thereafter, an adjustment of each of the color signals at the signal level (that is, a white balance processing) is performed.

The signal output from the analog processor 40 is converted into a digital signal by an A/D converter 42 and stored in a buffer memory 46. A timing generator (TG) 44 supplies a timing signal to the CCD drive circuit 38, the analog processor 40 and the A/D converter 42 according to the commands of a sub CPU 68. The respective circuits are synchronized according to the timing signal.

The data stored in the buffer memory 46 is sent to a YC signal processor 50 through a bus 48. The image data input in the YC signal processor 50 is converted into a luminance signal (Y signal) and color difference signals (Cr and Cb signals). Then, predetermined processing, such as a gamma correction, is performed to the respective signals. Thereafter, the signals are stored in the buffer memory 46. The YC signal in the memory 46 is read and output to the LED monitor 25 through a display circuit 52 in which the YC signal is converted into the RGB signal and the driver 54. Thereby, the through image, the taken still image and the like are displayed in the LED monitor 25.

Further, the YC signal of the still image is compressed to a predetermined format by a compander circuit 58, and recorded in a memory card 62 through an interface (I/F) circuit 60. Furthermore, in a reproduction mode, the image data recorded in the memory card 62 is decompressed by the compander circuit 58, and output to the LED monitor 25 so that the reproduced image is displayed on the LED monitor 25.

According to the various program sequences recorded in an EEPROM 65, a main CPU 64 controls overall operation of each circuit by the input from the shutter button 14 and an operation unit 66 which includes the zoom keys 23 and 24, the cross key 27 and the like. Further, the main CPU 64 and the sub CPU 68 perform inter-CPU communications. The sub CPU 68 controls the auto focus (AF), the auto exposure (AE) and the like, and sends commands for the flash emission to an LED controller 70 when necessary.

The autofocus (AF) control is a contrast AF which moves the lens system 12a to maximize the high frequency component of green signal. When the shutter button 14 is half-pressed, the lens system 12a is shifted through a focus driver 72 and set at a focusing position in which the high frequency component of the green signal reaches the maximum value.

Further, the auto exposure (AE) control, the green signal is read from the buffer memory 46 through the bus 48, and the exposure amount (the exposure value) is calculated according to the integral of the green signal. The aperture value and the shutter speed are determined according to the calculated exposure value. Then, when the shutter button 14 is fully pressed, the aperture stop 34 is driven through an aperture stop driver 74 such that the aperture stop 34 achieves the determined aperture value. Further the charge store time is controlled to achieve the determined shutter speed by the electronic shutter of the CCD 36. The image data of one frame is obtained by reading the signal charges from the CCD 36 which is exposed at the determined EV value. Predetermined signal processing is performed to the obtained image data. Thereafter, the image data is recorded in the memory card 62.

The LED controller 70 boosts the voltage of a power supply battery and supplies the high voltage current to the LEDs 18-21. In an auto white balance (AWB) flash mode, which is the default mode, the LED to be emitted is changed according to the measured value of the color temperature of the photographic environment. When the amount of the external light is scarce (dark) or the when the white balance of the external light is good, the white LED 21 is emitted.

Further, when the images are taken inside the room, if there is a large influence by the tungsten light (that is, the image becomes reddish), or by the fluorescent tube (that is, the image becomes greenish), the red LED 18, the green LED 19 and blue LED 20 are emitted in a state that the ratio of respective light emission amounts is controlled so that the LED emission color becomes a complementary color to the each tone. Thereby, large changes in gain adjustment become unnecessary so that the noise of the image is reduced.

In FIG. 4, the flash device is constructed of the LED light source (the red LED 18, the green LED 19, the blue LED 20 and the white LED 21) and the LED controller 70.

Figure 5:
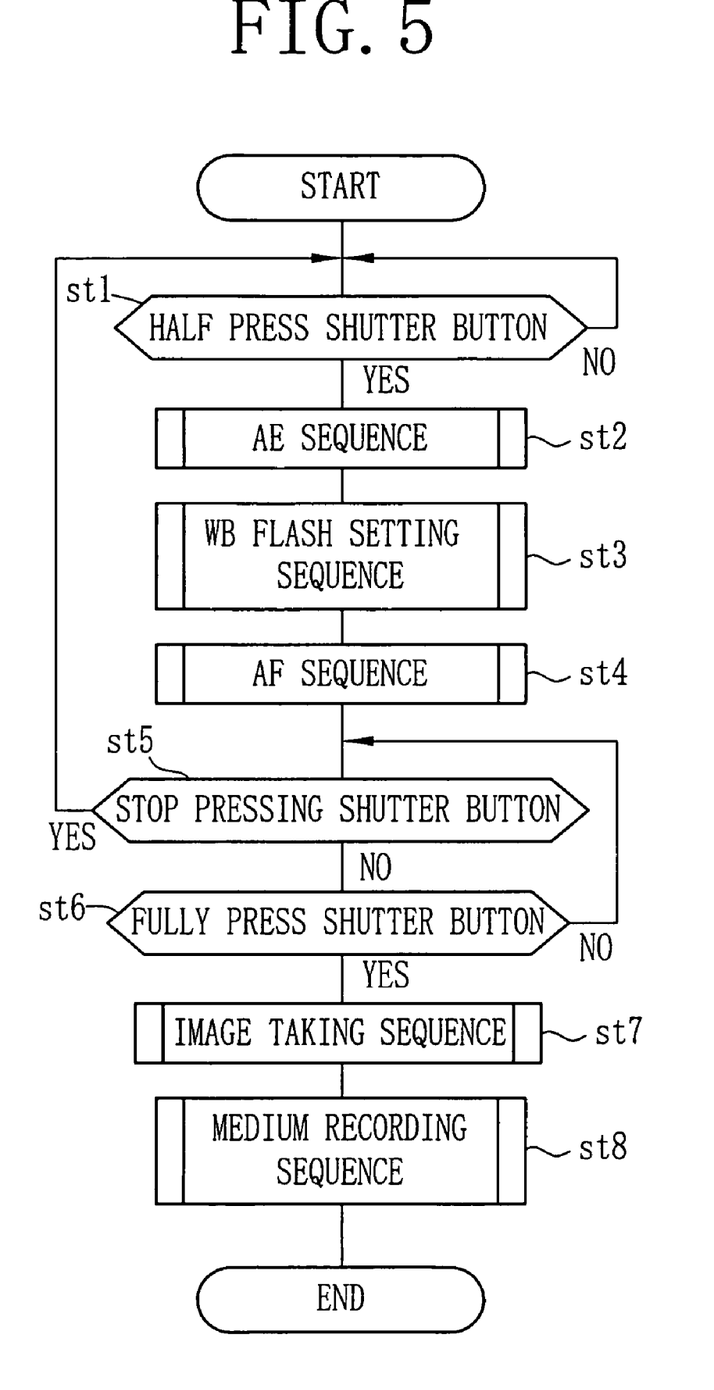
FIG. 5 is a flowchart showing an outline of an image taking sequence.
Figure 6:
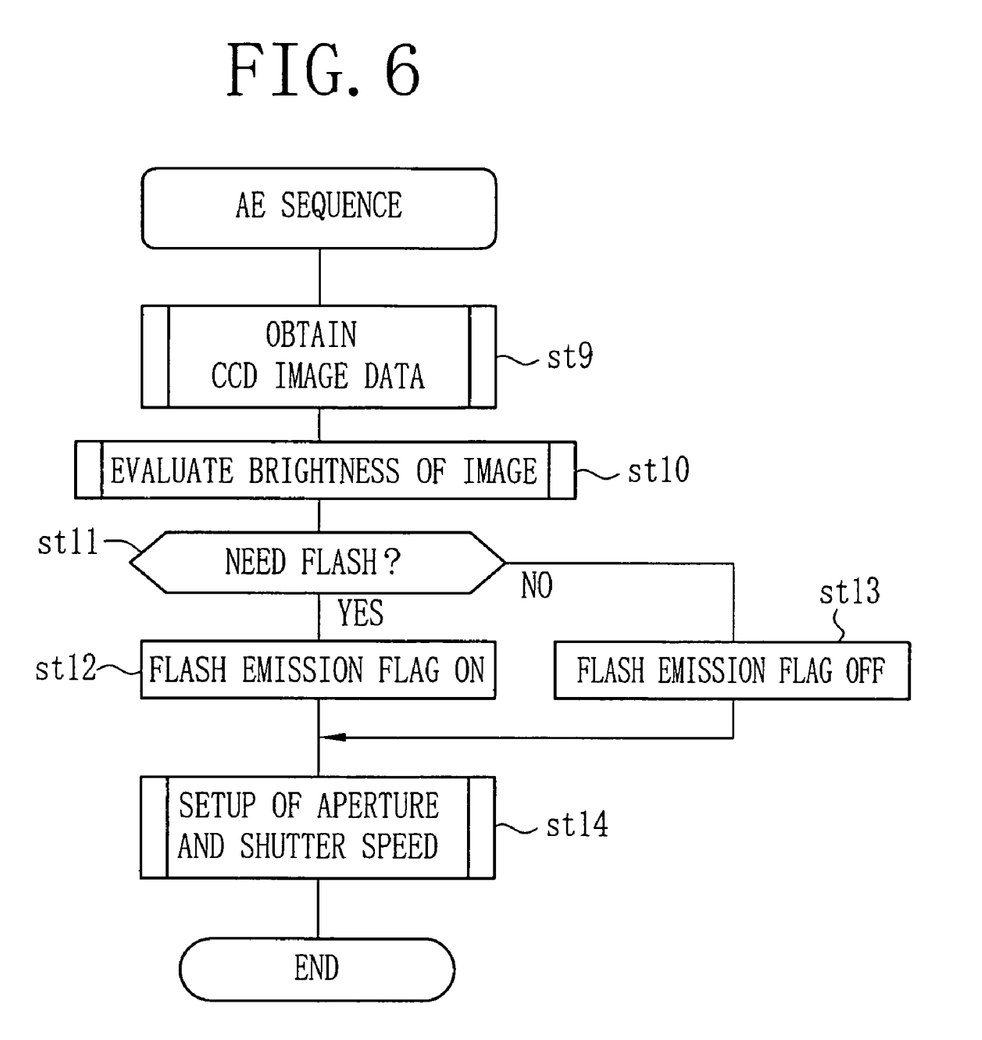
FIG. 6 is a flowchart showing an outline of an AE sequence.
Figure 7:
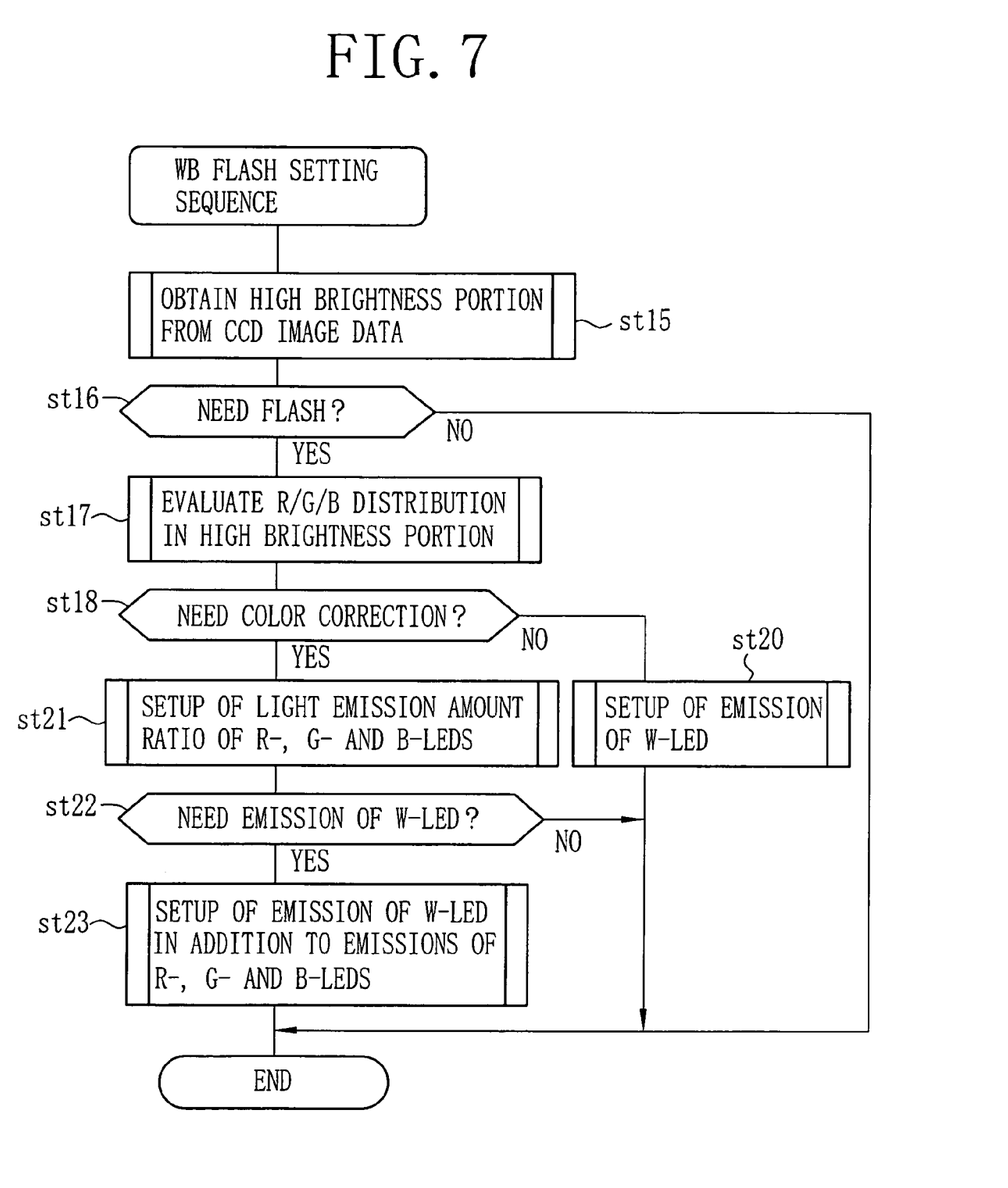
FIG. 7 is a flowchart showing a white balance setting sequence when an LED light source is automatically emitted.

Next, an operation of the above embodiment is described while referring to flowcharts in FIGS. 5-7. When the shutter button 14 is half-pressed (st1), an AE sequence (st2), a WB flash setting sequence (st3) and an AF sequence (st4) are sequentially executed. In the WB flash setting sequence (st3), setup of the white balance adjustment for the image light is performed by setting the emission control of the LEDs 18-21.

In the AE sequence, as shown in FIG. 6, the sub CPU 68 reads the green signal of one frame from the buffer memory 46 (st9), and evaluates the brightness of the image (st10). The sub CPU 68 determines whether the flash illumination is necessary or not according to the brightness of the image (st11). When the flash illumination is determined to be necessary, the sub CPU 68 turns on a flash emission flag (st12). When the flash illumination is not necessary, the sub CPU 68 turns off the flash emission flag (st13). Further, the sub CPU 68 sets the aperture and the shutter speed according to the subject luminance (st14). Note that the flowchart in FIG. 6 does not take the MA mode into account.

In the WB flash setting sequence, an auto WB flash setting sequence as shown in FIG. 7 is executed as the default. The sub CPU 68 reads the red, green and blue signals of one frame from the buffer memory 46 and detects the high brightness portion in the green signal whose luminance exceeds a predetermined threshold value. When the sub CPU 68 cannot detect the high brightness portion (for instance, in a scene of a landscape, such as distant mountains, and the like with almost no contrast), the main CPU 64 determines the flash emission is not necessary for adjusting the white balance for the external light. When the sub CPU 68 detects the high brightness portion (for instance, a night scene including the streetlight and the like), the main CPU 64 determines the flash emission is necessary (st16).

When the main CPU 64 determines that the flash emission is necessary, a red/green/blue distribution in the high brightness portion is evaluated to determine a degree of a color bias (st17). When there is a small color bias in the high brightness portion which can be adjusted without the large changes in the gain in the white balance processing in the analog processor 40, the color correction for the view field by the emission of the LEDs 18-20 is not necessary (st18). Accordingly, only the white LED 21 is set to be emitted (st 20).

Further, when there is a large amount of the color bias which requires the large changes in the gain in the white balance processing in the analog processor 40, the main CPU 64 determines the color correction for the view field by the emission of the LEDs 18-20 is necessary (st18). Then, the main CPU 64 sets the ratio of respective light emission amounts of the LEDs 18-20 such that the voltages respectively supplied to the LEDs 18-20 are varied (st21). When the main CPU 64 determines that the light emission amount is not sufficient (st22), the white LED 21 is set to be emitted along with the LEDs 18-20 (st23).

Thereafter, when the shutter button 14 is fully pressed (st6), an image taking sequence (st7) by the CCD 36 is executed. When the brightness of the image is compensated and/or the color of the view field is corrected concurrently with the operation of the electronic shutter function of the CCD 36, the sub CPU 68 sends the command to the LED controller 70. The LED controller 70 applies the high voltage current to the selected LEDs to be emitted. At that time, the emitted LEDs are heated to high temperature. However, the LEDs are immediately cooled by the heat radiation effect of the ornament plate 17. Thus, the destruction of the LEDs is prevented.

After the predetermined exposure amount of image light is introduced to the CCD 36, the above signal processing is performed to obtain the image data. Thereafter, a medium recording sequence (st8) for writing the image data into the memory card 62 is executed.

As described above, when there is the large color bias in the view field, the LEDs 18-20 are emitted by a predetermined ratio of the respective light emission amounts so that the color correction is performed. In addition, the white balance processing is performed to the image signal in the analog processor 40. As a result, an excellent white balance adjustment is achieved. Since there are no large changes in the gain in the white balance processing in the analog processor 40, the noise in the image does not increase. Note that when the pressing operation of the shutter button 14 is stopped before fully pressing the shutter button 14, the steps (st) 1-4 are canceled.

Figure 8:
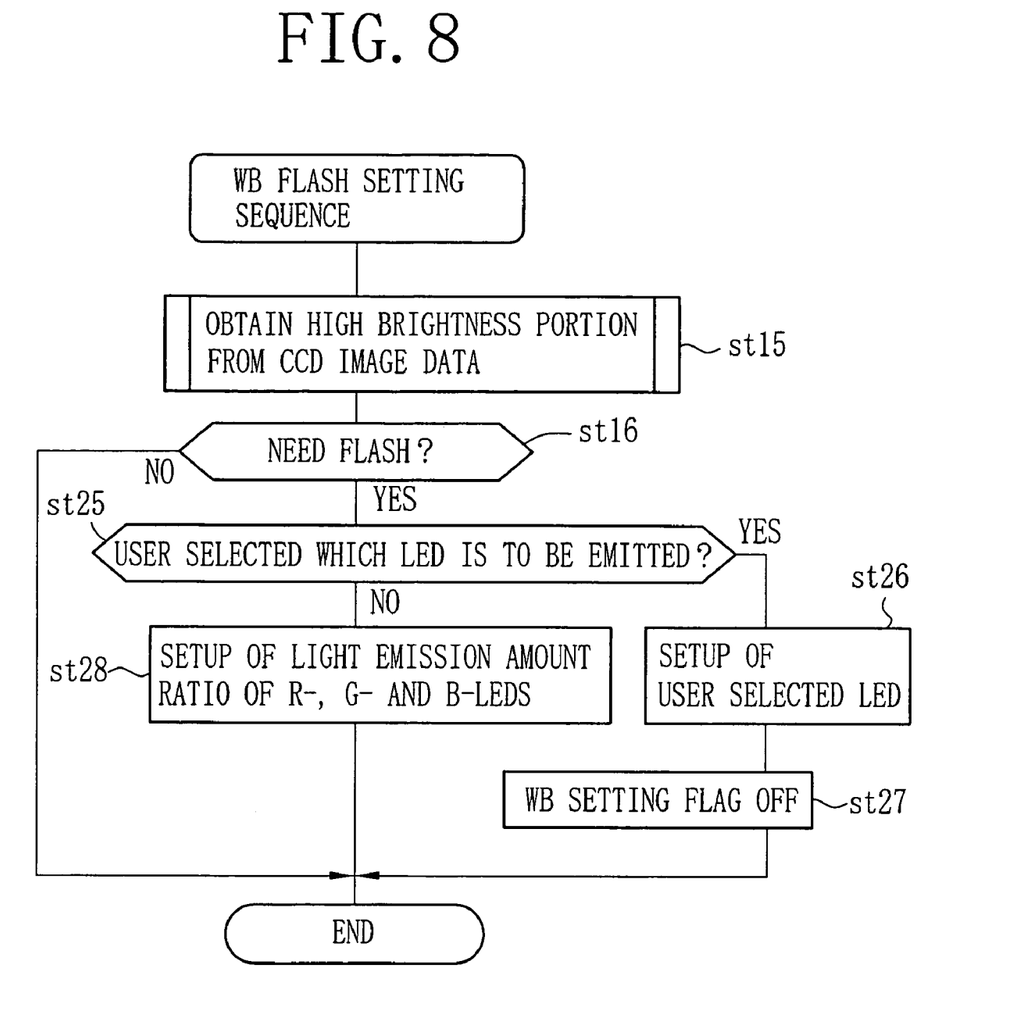
FIG. 8 is a flowchart showing a white balance setting sequence when the light emission amount of each LED is manually selected.

Next, a case where a user selects the LED to be used for the flash emission from the LEDs 18-21 is described while referring to a flowchart in FIG. 8. Before taking the image, the user selects the LED to be emitted, for instance, the red LED 18, as shown in FIG. 3. Even if the LED is manually set by the user as just described, the flash emission is not set in the scene, such as the distant mountains, in which the color correction by the flash emission is determined to be ineffective (st16).

When the user selected the red LED as the LED to be emitted in the sub menu shown in FIG. 3 (st25), the red LED 18 is set to be emitted (st26). In that case, the white balance setting flag is turned off in order not to perform the white balance processing in the analog processor 40 (st27). Further, when the LED is not selected by the user (st25), the ratio of the respective light emission amounts of the LEDs 18-20 is set so as to prevent the influence on the image by the color bias in the high brightness portion. That is, the voltages respectively supplied to the LEDs 18-20 are varied so that the LED emission color is to be the complementary color of the high brightness portion (st28).

Figure 9:
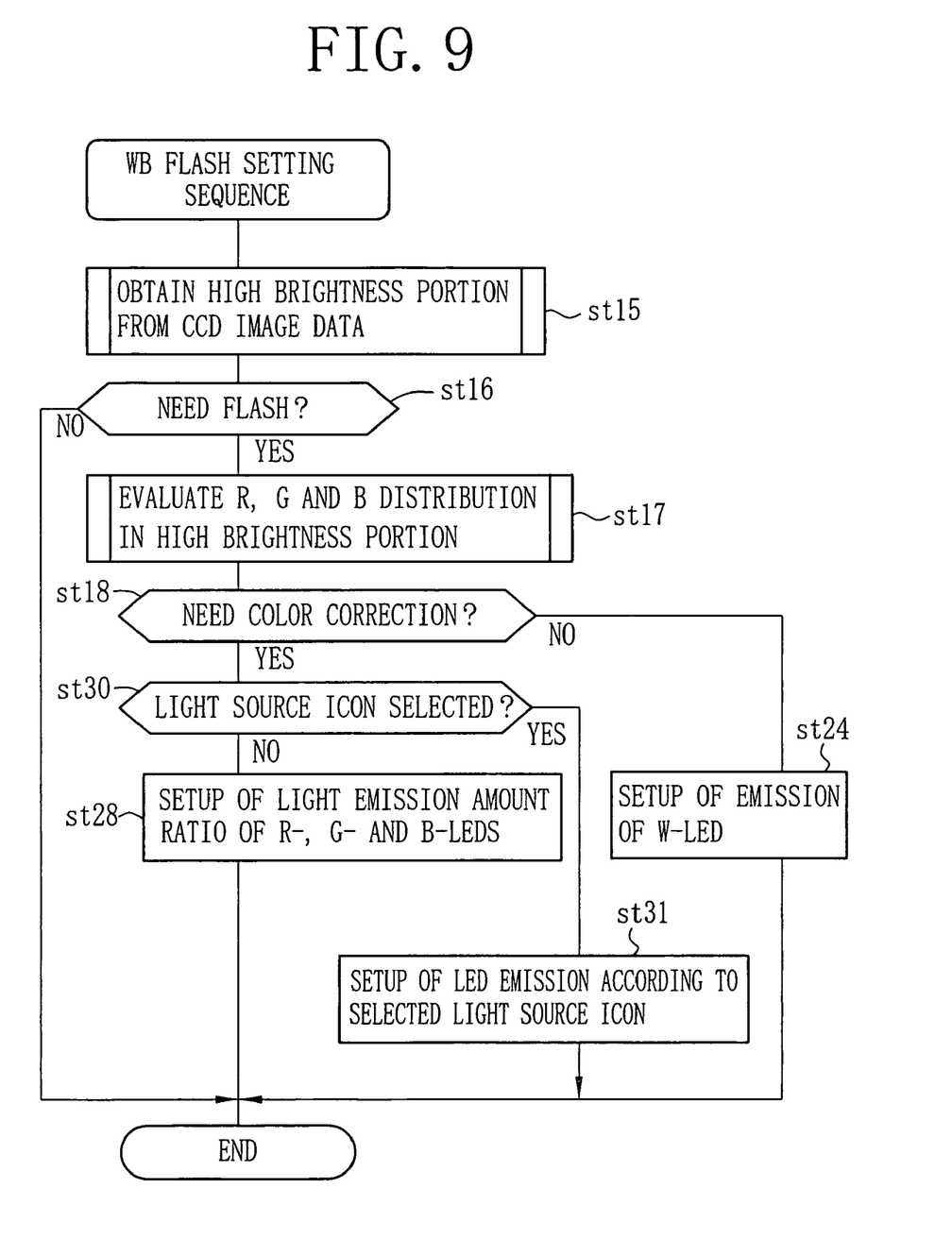
FIG. 9 is a flowchart showing a white balance setting sequence in which a light source is manually selected.

Next, referring to a flowchart in FIG. 9, a case is described where the user selects a type of the light source by selecting one of the light source icons 29-32 from the menu of the white balance adjustment (WB) as shown in FIG. 2. When there is a large color bias in the high brightness portion so that the color correction is necessary (st18), and one of the light source icons 29-32 is selected by the user (st30), the emission of the LEDs 18-20 is set up according to the user-selected light source icon (st31).

For instance, when the light source icon 29 is selected, the influence of the tungsten light is significant so that the image becomes reddish if the color correction is not performed. Accordingly, the sub CPU sets the green LED 19 and the blue LED 20 to be emitted without emitting the red LED 18. An actual ratio of the respective light emission amounts of the green LED 19 and the blue LED 20 is determined according to the correction data for the common tungsten light. Note that the ratio of the respective light emission amounts of the green LED 19 and the blue LED 20 can be determined according to an actual data obtained from an experiment or the like.

Figure 10:
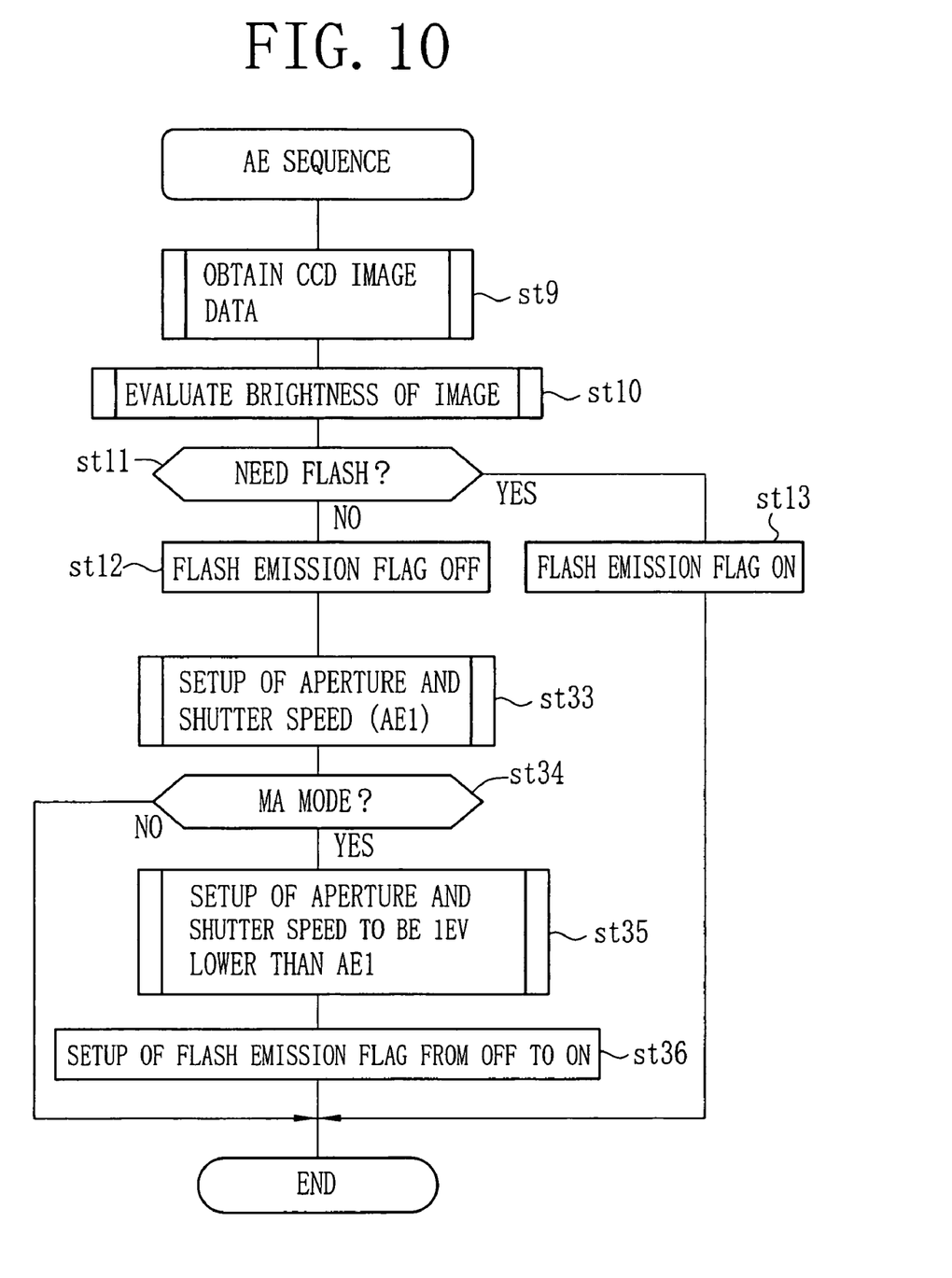
FIG. 10 is a flowchart showing an outline of the AE sequence including an MA mode in which an exposure is lower than the correct exposure by 1EV.
Figure 11:
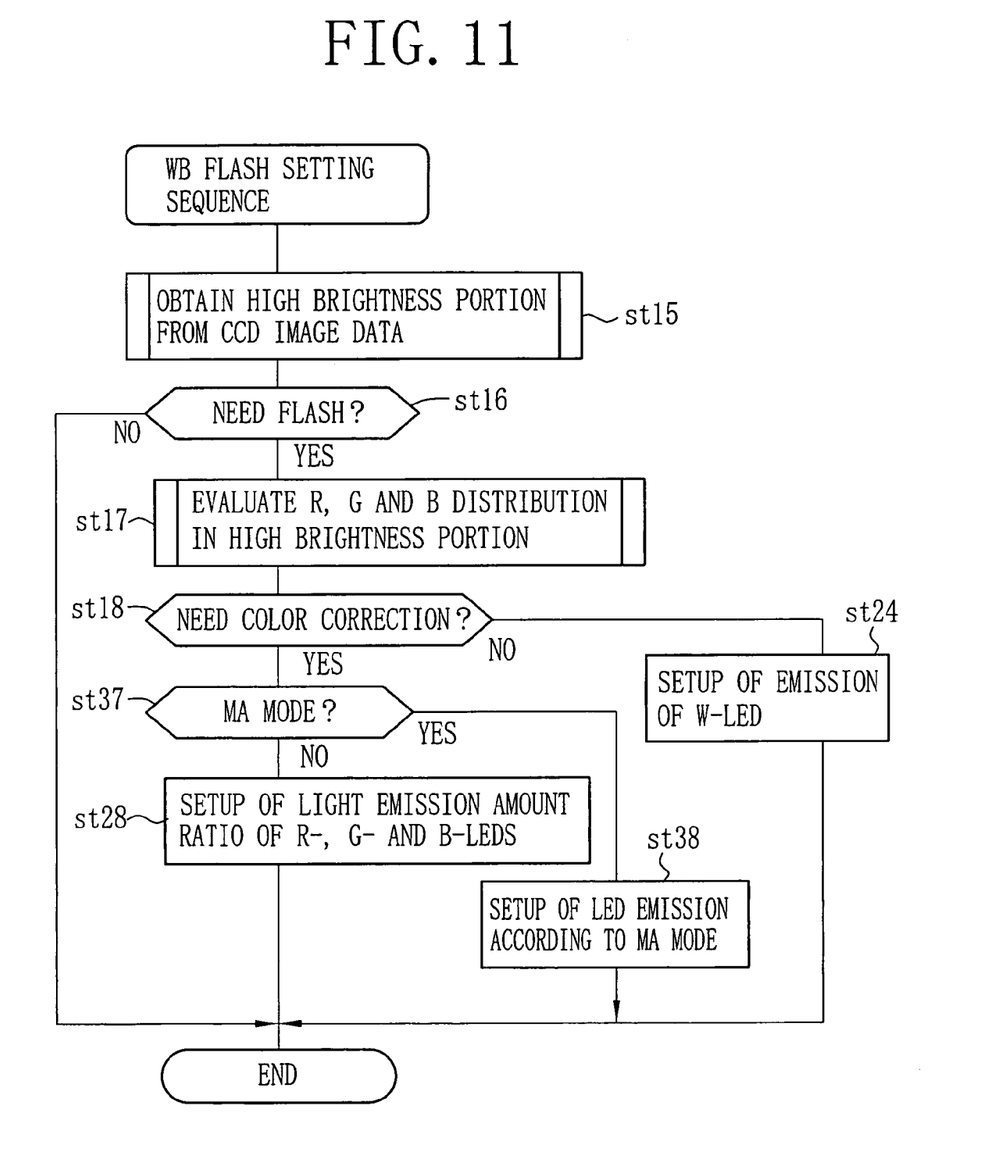
FIG. 11 is a flowchart showing a white balance setting sequence when the MA mode is selected.

Next, referring to flowcharts in FIGS. 10 and 11, a case is described where the user takes the images by selecting the MA mode. The user half-presses the shutter button 14 after selecting the MA mode. The brightness of the image is evaluated (st10) according to the image data (st9) obtained by the CCD 36. When the flash illumination is necessary (st11), the flash emission flag is turned on (st12). When the flash illumination is not necessary, the flash emission flag is turned off (st13). In both cases, the aperture and the shutter speed are set according to the normal automatic exposure (st33). The above setting is defined as "AE1".

Thereafter, the main CPU 64 checks whether the MA mode is set or not (st34). When the MA mode is set, the aperture and the shutter speed is set to achieve the exposure lower than the AE1 by 1EV (st35). The flash emission flag which has been turned off is turned on (st36). When the MA mode is not set, the setting of the aperture and the shutter speed remain at the AE1.

When there is a large color bias in the high brightness portion so that the color correction is necessary (st18), and the MA mode is selected by the user (st37), the LED emission is set according to the MA mode (st38). That is, the ratio of the respective light emission amounts of the LEDs 18-21 is set to compensate the exposure shortage (which is lower than AE1 by 1EV) so that the color correction is properly performed. Note that when the color correction is not necessary, the white LED 21 is set to be emitted (st24). Further, when the color correction is necessary, but the MA mode is not selected, the ratio of the respective light emission amounts of the LEDs 18-20 is set by varying the voltages respectively supplied to the LEDs 18-20 so that the LED emission color becomes the complementary color of the high brightness portion.

Figure 12:
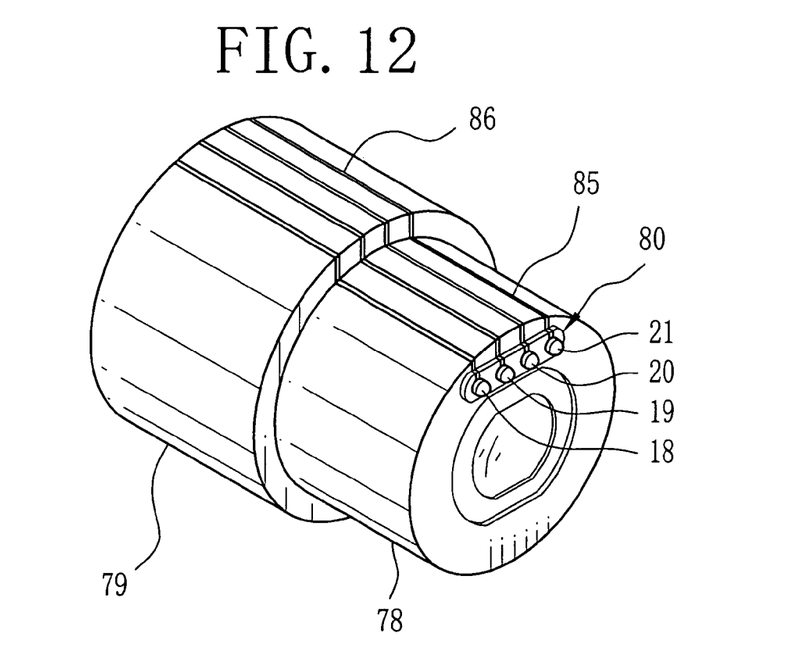
FIG. 12 is a perspective view showing a lens barrel according to an embodiment in which conductive patterns for an LED unit are formed on an outer periphery of the lens barrel.

In an embodiment shown in FIG. 12, a movable lens barrel 78 and a stationary lens barrel 79 are made of resin, for instance. A thin long plate 80 is attached in an upper section of a front face of the movable lens barrel 78. The plate 80 is formed of a metal having a heat radiation effect, for instance, a copper. Note that the camera body is omitted in FIG. 12.

In an embodiment shown in FIG. 1, the LEDs 18-21 attached to the front of the ornament plate 17 and the LED controller 70 are connected through the connection cords. However, in this embodiment, conductive patterns 85 and 86 formed of copper foil and the like are formed on an outer periphery of the lens barrels 78 and 79. Further, protection coating is applied to the respective surfaces of the lens barrels 78 and 79 on which the conductive patterns 85 and 86 are formed. Further, in this embodiment, the light diffusion cover is not used, for preventing the reduction of the light emission amount of the LEDs 18-21. Note that the plate 80 and the conductive patterns 85 and 86 are insulated from each other even though the plate 80 and the conductive patterns 85 and 86 may seem to contact with each other in FIG. 12.

Figure 13:
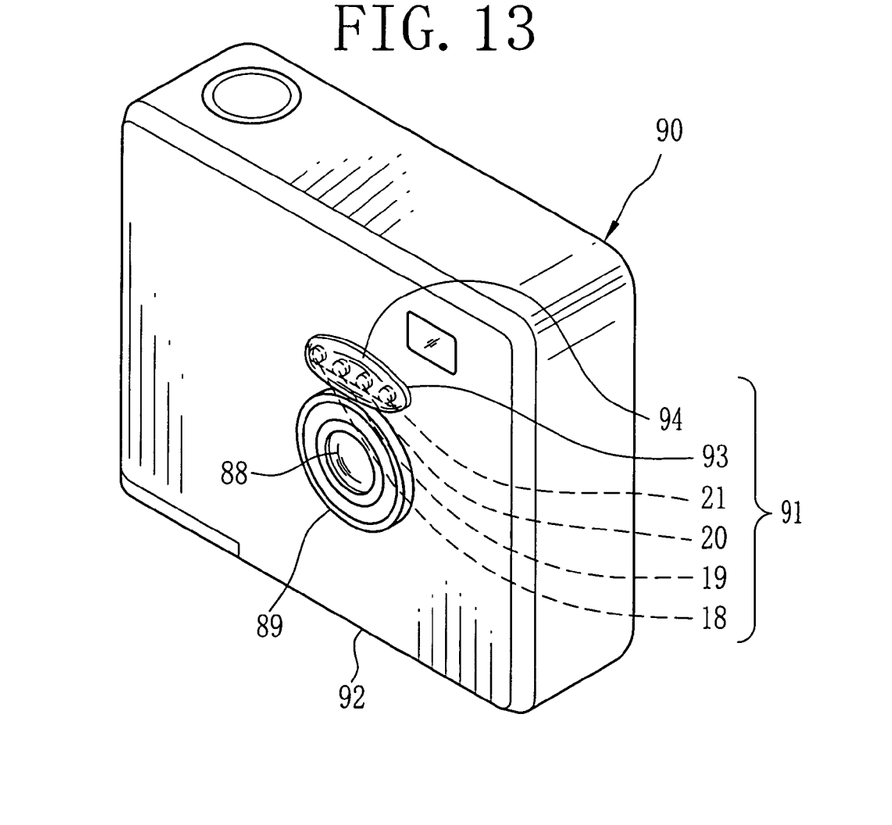
FIG. 13 is a perspective view of a digital camera according to an embodiment in which the LED light source is disposed on the front of the camera body.

In an embodiment shown in FIG. 13, in a digital camera 90, a taking lens 88 is a wide angle lens of a fixed focus, and a lens barrel 89 does not move. An LED unit 91 is attached close to the taking lens 88 on a front face of a camera body 92. In the LED unit 91, the LEDs 18-21 are attached to a plate 93 formed of aluminum. A light diffusion cover 94 made of a transparent resin having a light diffusion property is integrally attached to the plate 93 such that the light diffusion cover 94 covers the LEDs 18-21. That is, the LEDs 18-21, the plate 93 and the light diffusion cover 94 are formed as one unit so that the LEDs are easily attached to the digital camera.

Figure 14:
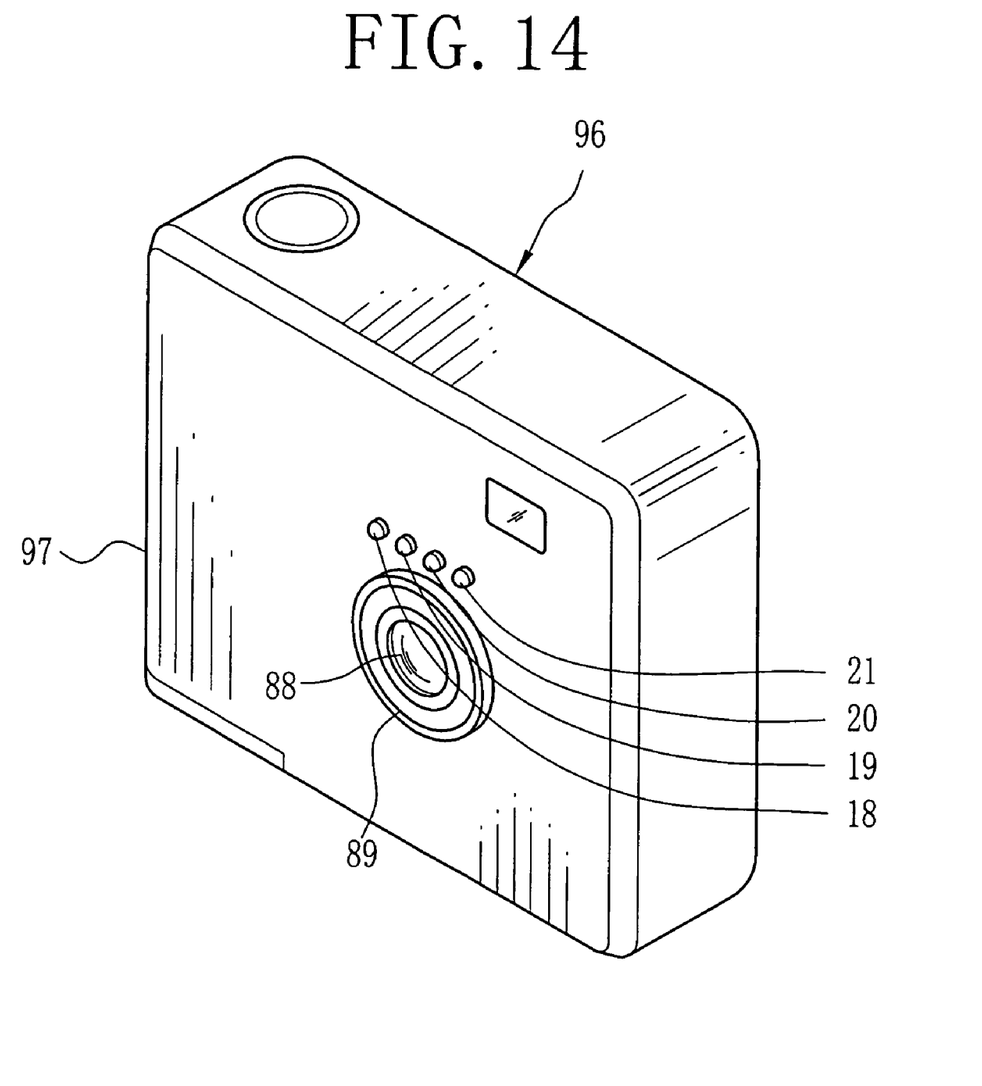
FIG. 14 is a perspective view of a digital camera according to an embodiment in which the LED light source is directly attached to the front of the camera body.

In an embodiment shown in FIG. 14, in a digital camera 96, a camera body 97 is formed of a metal having high heat radiation effect, for instance, an aluminum alloy, and the LEDs 18-21 are directly attached to the front face of the camera body 97. Note that in this embodiment, the light diffusion cover is not provided, so as to ensure the sufficient light emission amount. As for the digital cameras 90 and 96 shown in FIGS. 13 and 14, the flash light is effectively used since there is no vignetting caused by the lens barrel.

In the above embodiments, the examples are described (one in which the front of the LEDs are covered with the light diffusion cover and the other in which the LEDs are exposed without using the light diffusion cover). It is also possible to dispose, for instance, at least one lens on the front of the LEDs for gathering or diffusing the light. Further, the light diffusion cover is made of the transparent resin in the embodiments above. However, it is also possible to use, for instance, semi-transparent resin as long as having the light diffusion property. The forms of the light diffusion cover are not limited to those shown in FIGS. 1 and 13. For instance, a flat plate-like light diffusion cover can be used. In that case, a spacer may be placed between the plate 80 and the flat plate-like light diffusion cover.

In the above embodiments, each of the red, green, blue and white LED is used. However, plural LEDs, for instance, a combination of two LEDs by each color can be used. Further, in the above embodiments, the ratio of the respective light emission amounts of the red, green and blue LEDs is controlled by the voltages respectively applied to the LEDs. However, it is also possible to control the ratio of the respective light emission amounts by varying the emission time of each of the LEDs. In the above embodiments, the optical fixed focus lens is used as the taking lens and the electronic zoom is performed by the image processing. Instead, it is possible to use an optical zoom lens. The above LEDs are used only as the flash light source in the above embodiments. However, the LEDs may also serve as a fill light source of the AF (autofocus).

In the above embodiments, the LEDs are attached to the lens barrel 15 through the ornament plate 17. However, when the lens barrel 15 is formed of a metal with the high heat radiation effect, for instance, aluminum, the LEDs can be attached directly to the front face of the lens barrel 15. Further, the aluminum, the aluminum alloy and the copper are named as examples in the above embodiments. However, the present invention is not limited to the above metals. Other metals with the heat radiation effect can be used. In the above embodiments, the digital camera is described as the image taking apparatus. However, the present invention is not limited to the digital camera. For instance, a mobile phone with a camera, a PDA (Personal Digital Assistant) with a camera and the like can also be used. Further, the present invention can also be applied to the photographic film camera.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. An image taking apparatus having a main body, a lens barrel which is retractable into said main body, and a flash device, said flash device comprising:
   an LED light source for emitting flash light toward a subject; and
   a member attached to a front end surface of said lens barrel, said member being made of metal having a heat radiation effect, said LED light source being attached to said member,
   wherein said member is an ornament plate attached to said front end surface of said lens barrel.

2. An image taking apparatus according to claim 1, further comprising a solid state imaging device which converts an image of said subject into an electric signal.

3. An image taking apparatus according to claim 1, wherein said lens barrel is formed of plastic.

4. An image taking apparatus according to claim 3, wherein a conductive pattern for supplying electric power to said LED light source is formed on an outer peripheral surface of said lens barrel.

5. An image taking apparatus according to claim 1, wherein said LED light source including:
   at least one red LED which emits red flash light;
   at least one green LED which emits green flash light; and
   at least one blue LED which emits blue flash light.

6. An image taking apparatus according to claim 5, wherein said LED light source further includes at least one white LED which emits white flash light.

7. An image taking apparatus according to claim 6, wherein said flash device further includes an LED controller which controls respective intensities of said red flash light, green flash light, blue flash light and white flash light for adjusting a color balance of said flash lights.

8. An image taking apparatus according to claim 1, wherein said member is integrally attached to said front end surface of said lens barrel.

9. An image taking apparatus according to claim 1, wherein said LED light source is integrally attached to said front face of said main body.

10. An image taking apparatus having a flash device, said image taking apparatus including a main body and a lens barrel which is retractable into said main body, said flash device comprising:
    an LED light source for emitting flash light toward a subject, said LED light source being attached to a front end surface of said lens barrel having a heat radiation effect.

11. An image taking apparatus according to claim 10, further including a solid state imaging device which converts an image of said device into an electric signal, said solid state imaging device being disposed in said main body or in said lens barrel.

12. An image taking apparatus according to claim 10, wherein said LED light source further including:
    at least one red LED which emits red flash light;
    at least one green LED which emits green flash light; and
    at least one blue LED which emits blue flash light.

13. An image taking apparatus according to claim 12, wherein said LED light source further includes at least one white LED which emits white flash light.

14. An image taking apparatus according to claim 13, wherein said flash device further includes an LED controller which controls respective intensities of said red flash light, green flash light, blue flash light and white flash light for adjusting a color balance of said flash lights.

15. An image taking apparatus according to claim 1, wherein said member is integrally attached to said front face of said main body.

16. An image taking apparatus according to claim 10, wherein said LED light source is integrally attached to said front end surface of said lens barrel.

* * * * *